United States Patent
Kawai et al.

(10) Patent No.: US 7,336,418 B1
(45) Date of Patent: Feb. 26, 2008

(54) OPTICAL ATTENUATOR

(75) Inventors: Hirotaka Kawai, Tokyo (JP); Hiromitsu Umezawa, Tokyo (JP); Isao Kojima, Tokyo (JP); Hidenori Nakata, Tokyo (JP); Teruhisa Sahashi, Tokyo (JP)

(73) Assignee: FDK Corporation (JP)

( * ) Notice: Subject to any disclaimer, the term of this patent is extended or adjusted under 35 U.S.C. 154(b) by 0 days.

(21) Appl. No.: 09/959,671

(22) PCT Filed: Jun. 16, 2000

(86) PCT No.: PCT/JP00/03963

§ 371 (c)(1),
(2), (4) Date: Jan. 2, 2002

(87) PCT Pub. No.: WO01/65311

PCT Pub. Date: Sep. 7, 2001

(30) Foreign Application Priority Data

Mar. 1, 2000 (FR) ............................. 2000-55875

(51) Int. Cl.
*G02B 5/30* (2006.01)
(52) U.S. Cl. ....................... 359/484; 359/256
(58) Field of Classification Search ............... 359/484, 359/494, 495, 497; 385/140
See application file for complete search history.

(56) References Cited

U.S. PATENT DOCUMENTS 3,495,189 A 2/1970 Le Craw
4,529,875 A 7/1985 Brogardh et al.
4,698,820 A 10/1987 Brandle, Jr. et al.
4,896,103 A 1/1990 Shimanuki et al.
5,889,609 A 3/1999 Fukushima
5,978,135 A 11/1999 Abbott et al.

(Continued)

FOREIGN PATENT DOCUMENTS

EP 940704 A2 9/1999

(Continued)

OTHER PUBLICATIONS

Proceedings of General Meeting in 19999, the Institute of Electronics, Information and Communication Engineers, Tsushin 2 (Japan), Mar. 25, 1999, Nobuhiro Fukushima et al.,.

(Continued)

*Primary Examiner*—Stephone B. Allen
*Assistant Examiner*—Derek S. Chapel
(74) *Attorney, Agent, or Firm*—Clements Walker; Christopher L. Bernard (57) ABSTRACT

An optical attenuator with increased dynamic range and reduced temperature-dependence over the dynamic range. The optical attenuator has a Faraday rotational angle variable device which applies an external magnetic field to light polarized by a garnet crystal, and a polarizer and an analyzer disposed at the front and rear of the optical axis of the device. There is an angle x formed between the plane of polarization of the light incident to the garnet crystal and the magnetic field orthogonal to the optical axis, where an angle y is formed between the polarizer and the analyzer, and the angle x is set to satisfy $\{(-z/2)+90 \times n\}-12 < x < \{(-z/2)+90 \times n\}+12$ (n=0, 1, 2 or 3), where $z = y \pm 90$; z is the angle of rotation of the plane of polarization caused by the Faraday rotational angle variable device.

4 Claims, 8 Drawing Sheets

U.S. PATENT DOCUMENTS 6,108,120 A * 8/2000 Kawai et al. ............... 359/283

FOREIGN PATENT DOCUMENTS

| JP | 6-11664 A | 1/1994 |
| JP | 06 051255 A | 2/1994 |
| JP | 9-288256 A | 11/1997 |
| JP | 11-64808 A | 3/1999 |
| JP | 11 231274 A | 8/1999 |
| JP | 11-231274 A | 8/1999 |
| JP | 11231274 A * | 8/1999 |

OTHER PUBLICATIONS

Transactions of Nippon Jiki Gakkai, vol. 24, No. 5 (Japan), May 1, 2000, Hiromitsu Umeesawa et al., "Hikari Tsuushin you Jiki Kougaku device to Zairyou no Doukou", pp. 1035-1042.

JP Patent Abstracts, May 30, 1994.

JP Patent Abstracts, Nov. 30, 1999.

* cited by examiner

LIGHT

OPTICAL ATTENUATOR

TECHNICAL FIELD

The present invention relates generally to an optical attenuator having a polarizer and an analyzer integrated therein at the front and rear of the optical axis of a Faraday rotational angle variable device, and more particularly, to an optical attenuator that is able to widen its dynamic range and also able to reduce its temperature-dependence, by allowing an angle to lie within a specific range, the angle being formed between the direction of a component, orthogonal to the direction of light, of a magnetic field applied to a magnetic garnet single crystal in the Faraday rotational angle variable device, and the plane of polarization of the incident light to a garnet single crystal.

BACKGROUND ART

An optical communication system needs an optical attenuator to control the amount of light passing therethrough. The optical attenuator is configured to provide a polarizer and an analyzer at the front and rear (the incoming side and the outgoing side) of the optical axis of a Faraday rotational angle variable device. The Faraday rotational angle variable device to be integrated applies external magnetic field to a garnet single crystal having a Faraday effect in two or more directions, and by varying these synthesized magnetic field, it controls the Faraday rotational angle of a light beam passing through the garnet single crystal. The optical attenuator controls the amount of attenuating light, by controlling the Faraday rotational angle.

Figure 1A:
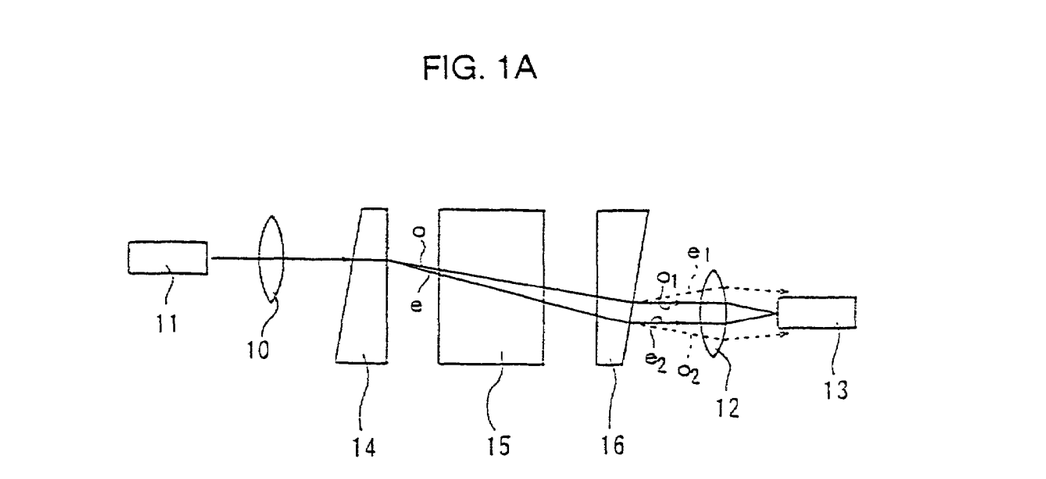
FIGS. 1A and 1B are explanatory diagrams of a polarization non-dependent attenuator.
Figure 1B:
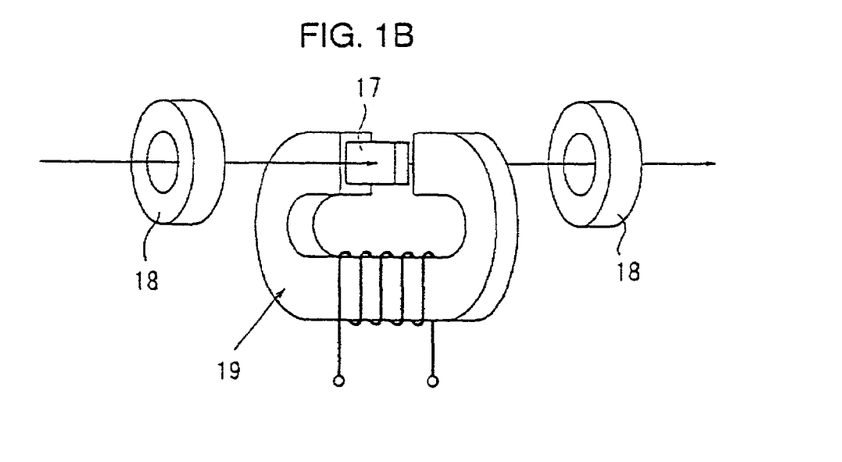

On the optical attenuator, for the polarizer and the analyzer, the use of a compound polarizing prism may be allowed as a principle, however, generally, it is more practical to use a wedge-shaped birefringent crystal on a fiber combination type device to make the device of a polarization non-dependence, because if the compound polarizing prism is used, the amount of incident light will be reduced nearly to half by the polarizer. FIG. 1 shows an example thereof.

As shown in FIG. 1A, between an input fiber 11 having a collimate lens 10 and an output fiber 13 having a collimate lens 12, a polarizer 14 comprising a wedge type birefringent crystal (for instance, a rutile crystal), a Faraday rotational angle variable device 15, and an analyzer 16 comprising a wedge type birefringent crystal (for instance, a rutile crystal) are located on the optical axis, in that order. As shown in FIG. 1B, the Faraday rotational angle variable device 15 comprises a combination of a garnet single crystal 17, a pair of permanent magnets 18 to apply magnetic field to the garnet single crystal from two different ways, 90 degrees apart from each other, and an electromagnet 19. The permanent magnets 18 are angular shaped and magnetized in the thickness direction, and generate a magnetic field of a parallel direction to the optical axis. The electromagnet 19 to generate a magnetic field in the vertical direction to the optical axis is configured so that it can vary the intensity of a magnetic field by the current to be passed through its coils. Therefore, the magnetizing direction of the garnet single crystal 17 will be varied, depending on the direction of the combined magnetic field of the fixed magnetic field by the permanent magnet 18 and the variable magnetic field by the electromagnet 19, and a Faraday rotational angle will be changed depending on the change made in the magnetizing direction.

Figure 2:
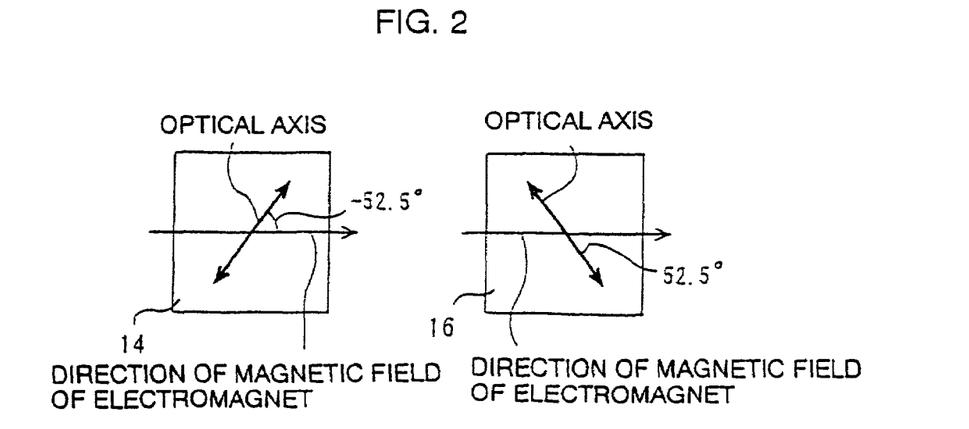
FIG. 2 shows the relation between the optical axes of the conventional polarizer and analyzer, and the magnetic field direction of the electromagnet.

Herein, as shown in FIG. 2, the polarizer 14 and the analyzer 16 have so far been located so that the optical axes of both of these birefringent crystals can form an angle of −52.5 degrees or +52.5 degrees from a horizontal surface, viewed from the optical axis direction (in other words, an angle formed by both axes is 105 degrees), and the magnetic field by the electromagnet is directed to a horizontal direction. The light coming out of the input fiber 11 will be turned into a collimated beam by the collimate lens 10, and will be further separated, by the polarizer 14, into a normal light o that is parallel to its optical axis and an abnormal light e that is vertical to its optical axis. (Therefore, the polarization directions of the normal light o and the abnormal light e intersect each other at a right angle.) And, when the individual light beams pass through the Faraday rotational angle variable device, the polarization directions will turn, depending on the size of magnetization in the direction parallel to the optical axis, and by the analyzer 16, each of these light beams will be separated into a normal light $o_1$ and an abnormal light $e_1$, or a normal light $o_2$ and an abnormal light $e_2$. The normal light $o_1$ and the abnormal light $e_2$ coming out of the analyzer 16 are parallel to each other, and will be combined to the output fiber 13 by the collimate lens 12 (represented by a solid line), however, the abnormal light $e_1$ and the normal light $o_2$ coming out of the analyzer 16 will not be combined to the output fiber 13, even if they pass through the collimate lens 12, because these light beams will spread out not in parallel lines (represented by a dotted line).

When the number of magnetic field to be applied by the electromagnet 19 is zero, the magnetization direction of the garnet single crystal is parallel to the optical axis, and the Faraday rotational angle will become maximum. As the normal light o coming out of the polarizer 14 will be sent out from the analyzer 16 as the normal light $o_2$, and the abnormal light e coming out of the polarizer 14 will be sent out from the analyzer 16 as the abnormal light $e_2$, both of the light beams are parallel and will be combined to the output fiber 13 by the collimate lens 12. On the contrary, when the magnetic field applied by the electromagnet 19 is large enough, the Faraday rotational angle will become minimum, and as the normal light o coming out of the polarizer 14 will come out of the analyzer 16 as the abnormal light $e_1$, and the abnormal light e coming out of the polarizer 14 will come out of the analyzer as the normal light $o_2$, these light beams will be difficult to be combined to the output fiber 13, even if they pass through the collimate lens 12. As described above, depending on the intensity of the magnetic field to be applied by the electromagnet 19, the magnetization of the garnet single crystal 17 turns, with the Faraday rotational angle changing in a certain range of angles, thereby changing the amount of light beams to be combined to the output fiber 13, thereby enabling the device to perform a function as an optical attenuator.

Here, the reason why the optical axes of the birefringent crystals that make up the polarizer and the analyzer are set at −52.5 degrees or +52.5 degrees from a horizontal surface, respectively, and an angle between these axes is set at 105 degrees is because of the resultant merits, including that the same shaped wedge type birefringent crystal can be used both for the polarizer and the analyzer, so that satisfactory productivity can be expected, and as described below, that the amperage to be supplied to the electromagnet can be lowered, and a large amount of optical attenuation can be obtained.

In view of circumstances of the power to be added to the electromagnet, the electromagnet is set at an angle of 90 degrees or more, when the magnetization is facing toward the light beam direction, and allow the angle to change within the angle range less than 90 degrees. For instance, when the magnetization faces toward the light beam direction, the Faraday rotational angle will become 96 degrees, and then, the Faraday rotational angle is reduced to 15 degrees by applying a magnetic field of the electromagnet. In this case, if the angle between the optical axes of both of the birefringent crystals, which function as the polarizer and the analyzer, are set at 105 degrees, a maximum amount of optical attenuation can be obtained when the Faraday rotational angle is 15 degrees.

However, optical attenuators of the conventional configuration have a problem that the range, in which the amount of optical attenuation can be changed, in other words, the dynamic range is too small. Also, another problem is found that the temperature-dependence of the dynamic range is so large that the lower temperature drops, the smaller the dynamic range becomes. For instance, the dynamic range at the room temperature is only about 25 dB at the largest, and when the temperature drops to −10° C. or less, the dynamic range will drop to 20 dB or less.

It is therefore an object of the present invention to provide an optical attenuator that is able to enlarge the range, in which the amount of optical attenuation can be changed, in other words, the dynamic range, and further able to reduce the temperature-dependence of the dynamic range.

DISCLOSURE OF THE INVENTION

The present invention provides an optical attenuator using a Faraday rotational angle variable device having an optical axis, the optical attenuator comprising a polarizer and an analyzer which are disposed at the incoming side and outgoing side, respectively, on the optical axis of the Faraday rotational angle variable device, the Faraday rotational angle variable device applying an external magnetic field to a garnet single crystal having a Faraday effect, from two directions or more, to vary the combined magnetic field to thereby control the Faraday rotational angle of light passing through the garnet single crystal. In the present invention, let x be an angle which is formed between the plane of polarization of a single incident light to the garnet single crystal after passing through the polarizer, or the plane of polarization of one of two lights, whose planes of polarization intersect each other at right angles, and the direction of the magnetic field orthogonal to the optical axis, applied to the garnet single crystal, and let y be an angle which is formed between the polarizer and the analyzer, then the angle x satisfies $[(-z/2)+90\times n]-12 \leq x \leq [(-z/2)+90\times n]+12$ (n=0, 1, 2 or 3), where z=y±90; z is the angle of rotation of the plane of polarization caused by passing through the Faraday rotational angle variable device when the magnetic field is applied. Usually, the external magnetic field applied to the garnet single crystal are oriented in two directions, a parallel direction and a perpendicular direction to the direction of light. Further, In this description, in terms of angles, a clockwise direction is expressed by N and a counterclockwise direction is expressed by "−".

More preferably, the angle x may satisfy $$[(-z/2)+90\times n]-4 \leq x \leq [(-z/2)+90\times n]+4$$

where n=0, 1, 2 or 3.

When a compound polarizing prism is used for a polarizer and an analyzer, an angle formed between the plane of polarization of light passing through the polarizer, and the plane of polarization of a light passing through the analyzer is set to y degree. And, x degree formed between the direction of a magnetic field to be applied in a perpendicular direction against the light beam direction, and the plane of polarization of a light coming into the garnet single crystal is set to satisfy the above equation.

Also, when a birefringent crystal is used for a polarizer and an analyzer, an angle forming the optical axes of both of the birefringent crystals is set to y degree. And, an angle x formed between the direction of a magnetic field to be applied in a perpendicular direction against a light beam direction, and the optical axis of the birefringent crystal installed at the incoming side of the garnet single crystal as a polarizer is set to satisfy the above equation. As a birefringent crystal, a parallel flat type may also be used in addition to a wedge type.

BEST MODE FOR CARRYING OUT THE INVENTION

An especially preferred embodiment of the present invention is configured as follows: In short, on an optical attenuator using a Faraday rotational angle variable device to control the Faraday rotational angle of the light beam passing through the garnet single crystal, installing a polarizer at the incoming side and an analyzer at the outgoing side of the optical axis of the Faraday rotational angle variable device, by applying external magnetic field to a garnet single crystal having a Faraday effect, from two or more directions, varying the synthesized magnetic field, an optical attenuator, where a birefringent crystal is employed both for the polarizer and the analyzer, and the optical axis of the analyzer is located at an angle of 105 degrees clockwise (or counterclockwise) direction from the optical axis of the polarizer, and external magnetic field to be applied to the garnet single crystal are located in two directions, a parallel direction and a perpendicular direction against the light beam direction, and the optical axis of the birefringent crystal, in other words, the polarizer, is located at an angle of 7.5 degrees counterclockwise (or clockwise) from the direction of the magnetic field to be applied in a perpendicular direction.

Figure 3:
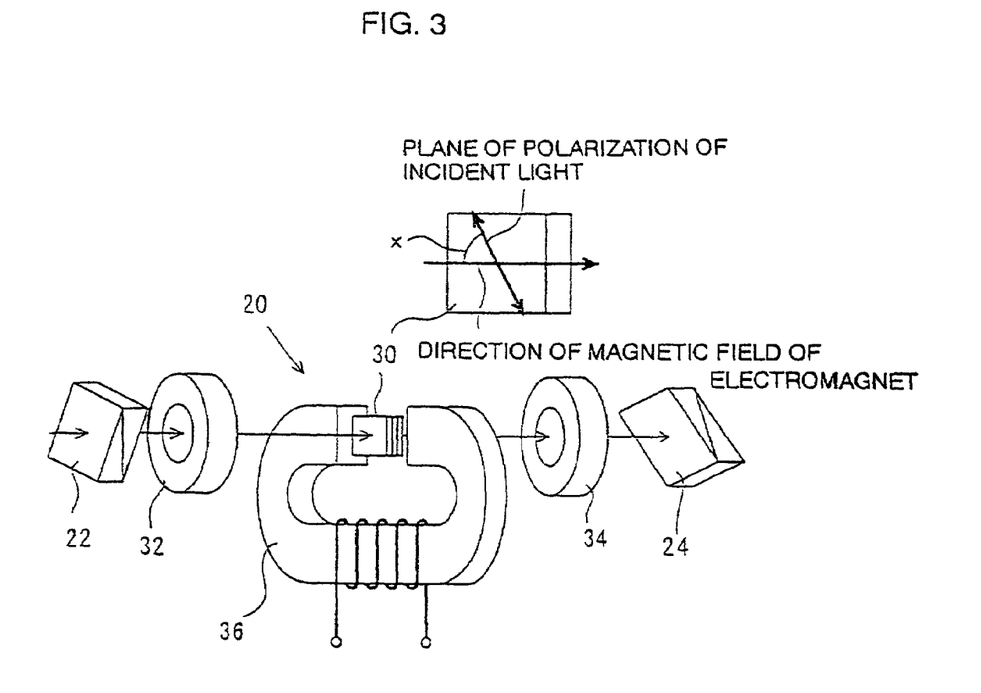
FIG. 3 is an explanatory diagram of the measurement system.

The inventor and others have tried several experiments, making a measurement system as shown in FIG. 3, to widen the dynamic range on an optical attenuator. This measurement system installs a polarizer 22 at the incoming side, and an analyzer 24 at the outgoing side on the optical axis of a Faraday rotational axis variable device 20, and fundamentally, has the same configuration as the configuration of the optical attenuator. The Faraday rotational angle variable device 20 comprises a garnet single crystal 30, permanent magnets 32 and 34 to apply a fixed magnetic field to the garnet single crystal 30, in a parallel direction to the optical axis, and an electromagnet 36 to apply a variable magnetic field in a perpendicular direction to the optical axis. Both of the polarizer 22 and the analyzer 24 comprise compound polarizing prisms having a structure, in which a polarization separating film is inserted between two right-angled triangle prisms, and the analyzer 24 was allowed to turn in accordance with the turning of the polarizer 22, to always keep the angle formed by these planes of polarization at 105 degrees. The magnetic field by the permanent magnets 32 and 33 is 16.6 kA/m. The garnet single crystal 30 comprises, as described later in the embodiment, three pieces having a Faraday rotational angle of 32 degrees, when the magnetization direction faces a parallel direction to the light beam direction, with the cardinal directions being designated and installed together.

Figure 4A:
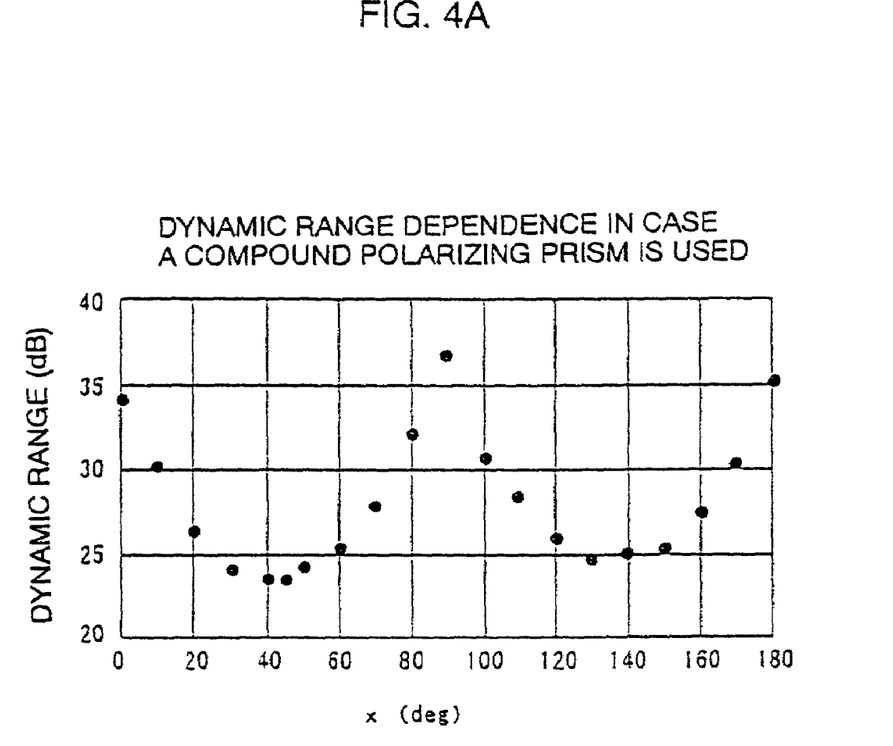
FIGS. 4A and 4B are graphs showing the relation between the dynamic range and the angle x.

As the result of experiment, a phenomenon has been recognized that by angle x formed by the plane of polarization of the incident light to the garnet single crystal 30, and the magnetic field to be applied in a perpendicular direction to the light beam direction, the dynamic range would be changed. FIG. 4A shows the relation of the dynamic range and angle x. Here, the dynamic range means the difference between the maximum amount of optical attenuation and the minimum amount of optical attenuation obtained when the magnetic field of the electromagnet was allowed to change. From FIG. 4A, it can be recognized that the dynamic range has peaks near 0 degree, 90 degrees and 180 degrees. In other words, the dynamic range became maximum, when the plane of polarization of the incident light and the magnetic field of the electromagnet in a perpendicular direction to the light beam are almost in parallel or perpendicular state. Measurement was made from x=0 degree through 360 degrees, but recording the measurement result was omitted for 180 degrees to 360 degrees, because the measurement result from 180 degrees through 360 degrees was the same as the result of measuring 0 degree through 180 degrees.

As described above, the reason why the dynamic range is changed by the angle formed by the light beam direction and the magnetic field to be applied in a perpendicular direction is because when the magnetic field in perpendicular direction to the optical axis is applied to the garnet single crystal, the magnetization of the garnet single crystal inclines from a parallel direction to the optical axis, thereby generating a magnetized element in a perpendicular direction to the traveling direction of light, however, when light passes through the garnet single crystal, the refracting index of the magnetized element direction and the refracting index of that in a perpendicular direction thereto within a plane vertical to the optical axis of light are not identical, and as a result, an amount of optical delay (phase difference) occurs. When angle x nearly equals 45 degrees, as the element in the magnetized element direction and the element in a perpendicular direction exist at the same time within the plane vertical to the optical axis of light, the impact of phase difference to the dynamic range becomes the greatest, thereby causing the dynamic range to maximally drop. On the contrary, when light is in nearly parallel direction to the magnetized element direction (x≈0 degree), or in nearly perpendicular direction (x≈90 degrees) within the plane vertical to the optical axis, although each of the refracting indexes is not identical, phase difference could not occur, as they are nearly in isolation from each other, thereby allowing the dynamic range to become maximum.

By the way, for a polarization non-dependent optical attenuator, a birefringent crystal is used as a polarizer and an analyzer. As described above, this birefringent crystal performs a function to separate the incident light into two polarized lights intersecting at right angles. Because of this, to the garnet single crystal, two polarized lights intersecting at right angles will enter at the same time. Therefore, when one of the two polarized lights is aligned with a parallel direction to the magnetized element within the plane vertical to the optical axis, the other will be in a direction intersecting that direction at right angles, thereby causing phase difference to happen because of different refracting indexes of these two polarized lights.

To look at the impact to the dynamic range in this case, on the measurement system shown in FIG. 3, a wedge type rutile crystal, a birefringent crystal, is used for the polarizer 22 and the analyzer 24, and measurement was made on the dynamic range, while changing angle x formed between the optical axis of the rutile crystal on the incoming side and the applying magnetic field direction of the electromagnet. The angle formed between the optical axes of both of the rutile crystals for the polarizer and the analyzer is 105 degrees, and the other conditions are all the same as in the case of the compound polarizing prism.

Figure 4B:
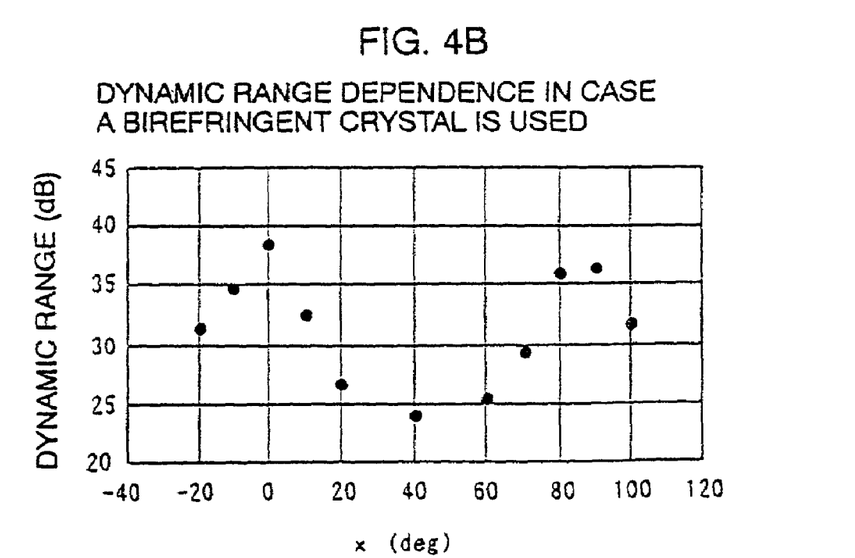

FIG. 4B shows the result of measurement. From FIG. 4B, it was found that the dynamic range became maximum, when the plane of polarization of the incident light and the magnetic field of the electromagnet in a direction intersecting the light beam at right angles were nearly parallel or in the state of almost intersecting at right angles, like the case of a compound polarizing prism was used, even if in the case of using a birefringent crystal for a polarizer and an analyzer.

From the result shown in FIGS. 4A and 4B, it was made clear that the dynamic range could be widened at least to 30 dB, by properly selecting the angle formed between the plane of polarization of the incident light to the garnet single crystal for the Faraday rotational angle variable device, and the magnetic field to be applied in the direction which intersects the light beam direction at right angles.

Figure 5A:
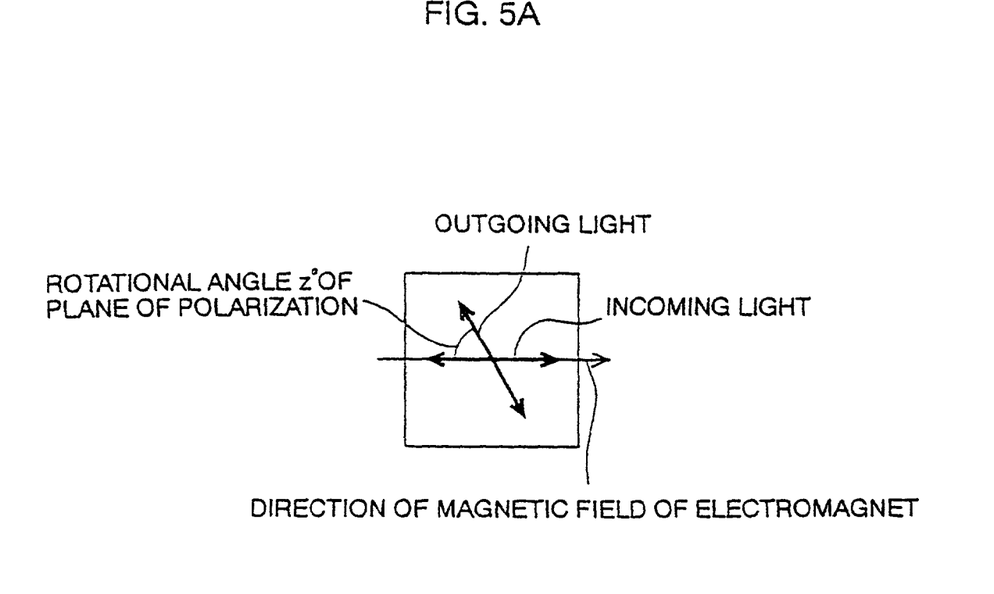
FIGS. 5A and 5B are explanatory diagrams showing the planes of polarization of the incoming light and outgoing light to/from the Faraday rotational angle variable unit.

However, as the result of further detailed experiments being made, it was made clear that a curve showing the dynamic range did not show symmetry at the locations of x=0 degree, 90 degrees and 180 degrees, and strictly speaking, these locations did not mean peak locations. It can be considered that a Faraday effect of the garnet single crystal might be the cause. In other words, as the garnet single crystal has a function to turn the plane of polarization of light passing through the crystal, by its Faraday effect, even if at the entry position of the garnet single crystal, the angle of the plane of polarization is strictly aligned with a parallel direction to the magnetized element in a vertical direction to the optical axis, or in a direction intersecting the parallel direction at right angles, at the outgoing position, the plane of polarization was turned for a certain degrees (See FIG. 5A). Therefore, an optimum condition is expected to be found by compensating angles with respect to a rotational angle of the plane of polarization within the garnet single crystal.

As the result of studies made on conditions to obtain a maximum extinction ratio, in such view points as described above, the inventors have found that the extinction ratio of light passing through the garnet single crystal would become maximum when, let x be an angle which is formed between the plane of polarization of a single incident light to the garnet single crystal after passing through the polarizer, or the plane of polarization of one of two lights, whose planes of polarization intersect each other at right angles, and the direction of the magnetic field orthogonal to the optical axis, applied to the garnet single crystal, and let z be the angle of rotation of the plane of polarization caused by passing through the Faraday rotational angle variable device, then the angle x satisfies $[(-z/2)+90\times n]$ where n=0, 1, 2 or 3. The extinction ratio will become more than 30 dB in the range $$[(-z/2)+90\times n]-12 \leq x \leq [(-z/2)+90\times n]+12$$

and especially, in the range $$[(-z/2)+90\times n]-4 \leq x \leq [(-z/2)+90\times n]+4$$

a very good characteristic could be obtained to achieve the extinction ratio being more than 40 dB. Moreover, when an angle formed by the polarizer and the analyzer is supposed to be y degree, and the rotational angle z of the plane of polarization equals z=y±90, in other words, against z at the time when the relation between the light passing through the garnet single crystal and the analyzer is in "crossed-Nicol" state (state of intersecting at right angles), if angle z satisfies the above-mentioned range, the amount of maximum attenuation of the optical attenuator would become larger, and as a result, it was found that a very good characteristic could be obtained to achieve the dynamic range being more than 40 dB. Moreover, the inventor and others also found that the temperature-dependence of the dynamic range could be reduced by selecting angle x formed between the light beam direction against the rotational angle z degree of the plane of polarization, and the direction of the magnetic field to be applied in the direction intersecting at right angles, within the range of angles properly.

Figure 5B:
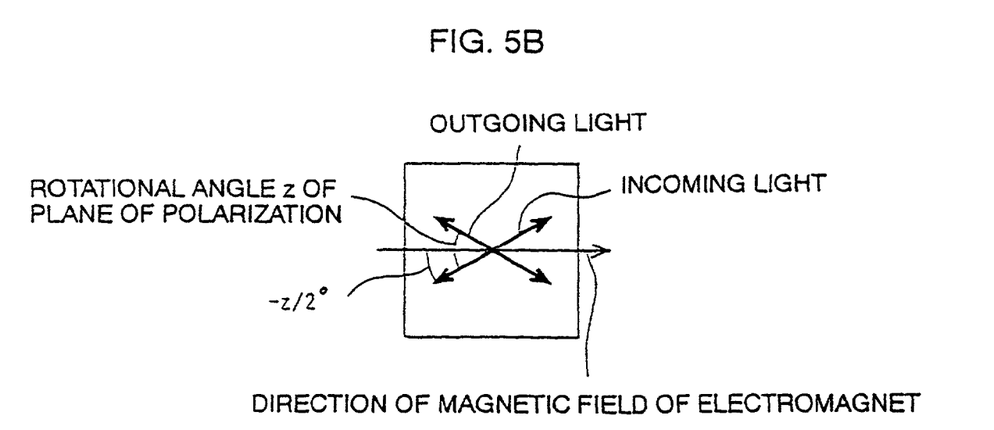

These phenomena are considered as follows: Incident light is specified so that a plane of polarization after passing through a polarizer and a magnetic field to be applied in a direction intersecting a light beam direction at right angles can be in a relation of angle x=(−z/2). As shown in FIG. 5B, this means a state where light enters the garnet single crystal at an angle of z/2 in the opposite direction of the turning direction of the rotational angle of the plane of polarization occurs when passing through the garnet single crystal. As described above, when a plane of polarization inclines from the direction of a magnetic field to be applied in a direction intersecting a light beam at right angles, "blunting" (degradation of extinction ratio) occurs by the influence of birefringence, however, the inclination can be minimized by using the layout as shown in FIG. 5B. FIG. 5B shows that the maximum value of the inclination (angle x) can be minimized, as the plane of polarization turns around the direction of the magnetic field in a direction intersecting a light beam at right angles. From this, it is expected that the effect of birefringence to be received when light passes through the garnet single crystal can be suppressed to a minimum, and "blunting" can also be suppressed to a minimum. Here, as the plane of polarization turns around the magnetic field direction in a direction intersecting a light beam at right angles, the magnetic field direction is taken as standard, and as angle x is in the opposite direction of the rotational angle z of the plane of polarization, a minus symbol is attached thereto.

Next, light, whose blunting is suppressed to a minimum, is regulated by z=y±90, so that the light and the analyzer can be in the state of intersecting at right angles. By this, it can be possible to bring out the best in blunting suppress effects. Even if blunting when light passes through the Faraday rotational angle variable device can be minimized, if the plane of polarization of the light has an inclination of 45 degrees to the analyzer, the dynamic range as an optical attenuator cannot be widened, because of the effect of angle displacement. As the "crossed-Nicol", state is the most sensitive state against blunting of light, the maximum amount of attenuation is expected to become larger, by bringing the light whose blunting is minimized, in the state in which it intersects the analyzer at right angles. As described above, the present invention is expected to be able to widen the dynamic range of the optical attenuator, and further to be able to reduce its temperature-dependence, because the present invention specifies to minimize blunting of light taking place when light passes through the Faraday rotational angle variable device, and further to bring the light in that state into the state of intersecting analyzer at right angles. The present invention has been completed based on the know-how gained from such phenomena.

EMBODIMENTS

Embodiment 1

A system shown in FIG. 3 was manufactured, and the relation among the extinction ratio of the garnet single crystal and the angle x (an angle formed between the plane of polarization of light passed through the polarizer, in other words, the plane of polarization at the entry position of the garnet single crystal and the magnetic field direction of the electromagnet) and angle z (the rotational angle of the plane of polarization when light passes through the garnet single crystal) were studied. The angle z was allowed to vary by changing of the magnetic field to be applied by the electromagnet, and the angle x was allowed to vary by turning of the polarizer (compound polarizing prism). For information, the magnetic field intensity of the permanent magnet is 16.6 kA/m.

Figures 6A, 6B, 6C, 6D:
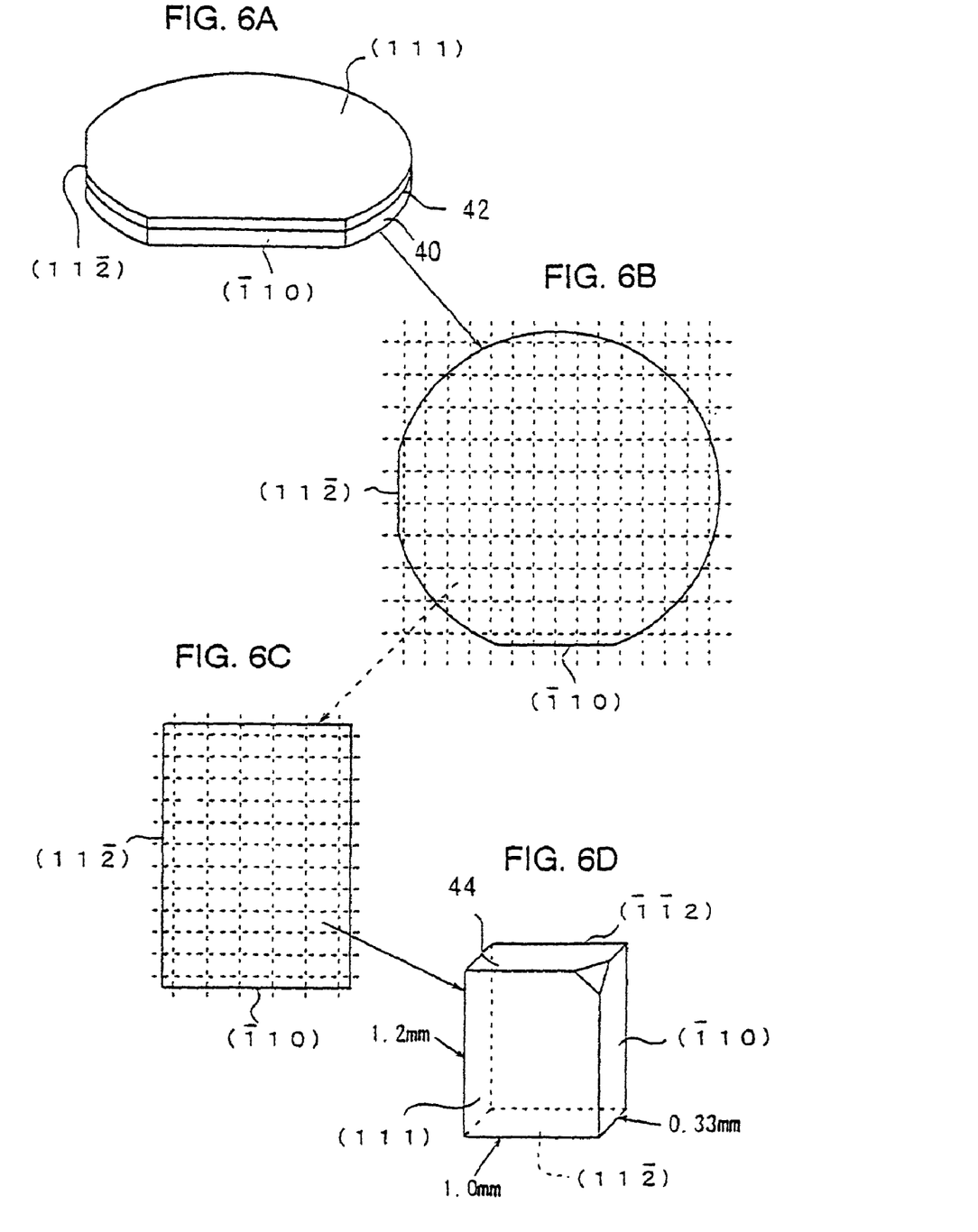
FIGS. 6A-6D are explanatory diagrams of the manufacturing process of the garnet single crystal.

First, the garnet single crystal was manufactured as follows: With $PbO$—$B_2O_3$—$Bi_2O_3$ as a solvent, by the LPE method, on the face (111) of a non-magnetic garnet substrate 40, with grating constant being 12.496 Å, composition being $(CaGd)_3(MgzrGa)_5O_{12}$, having a diameter of about 76 mm (3 inches), and thickness of 1170 μm, Bi substitution rare earth steel garnet single crystal 42 (LPE film, composition: $Tb_{1.00}Y_{0.65}Bi_{1.35}Fe_{4.05}Ga_{0.95}O_{12}$, film thickness 450 μm) was reared (See FIG. 6A). The substrate has two flat faces, (orientation flat), large one and small one, and the large flat face is (−110) face, and the small flat face is (11-2) face. Next, the obtained LPE film was cut into 7.6×5.0 mm (the cut out line is shown by a dotted line in FIG. 6B), and after the substrate was removed by polishing, heat treatment was made in the atmosphere at 1100° C. for 8 hours. The purpose of this heat treatment was to reduce the uniaxial magnetic anisotropy, as this nature of the LPE film in the as-grown state is significant, by growth induction. After the heat treatment, mirror finish was made by re-polishing to finish into a shape of 7.6×5.0×0.33 mm, and on the (111) face on both of the front and back faces, a reflection preventive film was vapor deposited (See FIG. 6C). Then, the work was cut into 1.0×1.2×0.33 mm (the cut line is shown by a broken line in FIG. 6C), and finally, the corners at the intersections of the (111) face, (−110) face and (−1-12) face were slightly trimmed to make markers for the cardinal points. FIG. 6D shows the shape and faces of the obtained garnet single crystal 44. (For information, crystal face notation expresses a minus index by drawing a horizontal bar above the index, however, this description cannot do this, so instead, a minus symbol is attached to express a minus index.)

Figure 7:
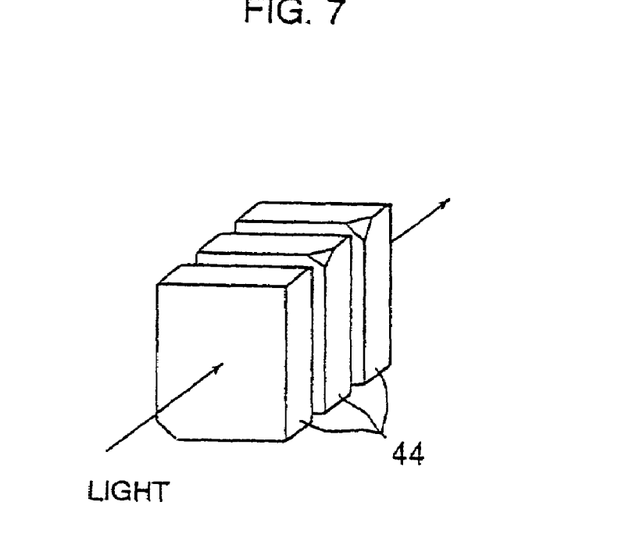
FIG. 7 is an explanatory diagram of the state of arrangement of the garnet single crystals.

On the measurement system shown in FIG. 3, measurement was made by allowing a light beam to enter vertically to the face, on which a reflection preventive film was vapor deposited, of the garnet single crystal, in other words, the (111) face. Three pieces of the garnet single crystal 44 manufactured as described above were placed after the cardinal points were designated as shown in FIG. 7, and inserted as the garnet single crystal 30 in FIG. 3. At this time, the (−1-12) face with the cardinal points marker attached of the nearest garnet single crystal was placed at the S Pole of the electromagnet, and the (−1-12) faces with the cardinal points markers attached of the two garnet single crystals at the rear side were placed at the N Pole side of the electromagnet.

Each of the garnet single crystals has a Faraday rotational angle of 32 degrees, when the magnetized direction faces in a parallel direction to the light beam direction, therefore, the three garnet single crystals have the total Faraday rotational angle of 32 degrees×3 pieces=96 degrees (temperature 25° C., wavelength 1550 nm). Initially, the film thickness of the grown garnet single crystal was 450 µm, but the film thickness became thinner because of being treated, thereby causing a Faraday rotational angle per piece to be smaller, and this is the reason for using of three pieces of the garnet single crystals here. At this point of time, crystal rearing by the LPE (liquid phase epitaxial) method enables rearing of thick film exceeding 500 µm thickness, and the number of the substrates to be used may be less than or equal to 2 pieces, if a Faraday rotational angle can be increased by increasing the thickness of each garnet single crystal after treatment.

Figure 8:
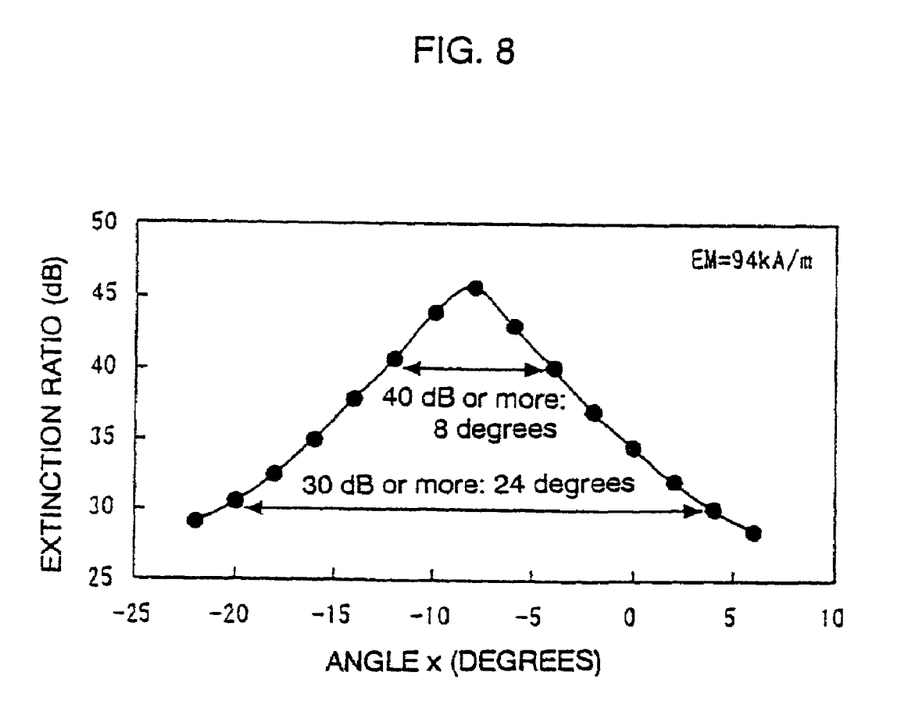
FIG. 8 is a graph showing an example of the relation of extinction ratio against angle x.

To the garnet single crystal, a variable magnetic field in a direction intersecting the light beam direction at right angles is given by the electromagnet, and a fixed magnetic field in a parallel direction to the light beam direction is given by the permanent magnet. Detailed measurements were made on the relation between the extinction ratio (dB) and the angle x (degree), with a variety of the magnetic field intensities (EM) by the electromagnet. As a representative example, FIG. 8 shows the relation between the extinction ratio (dB) and the angle x (degree), when the magnetic field intensity by the electromagnet is EM=94 kA/m. As the extinction ratio changes depending on the angle x, and at the point of x=−7.5 degrees, the extinction ratio drew a convex shaped curve to show the maximum value. Against the xmax that allows the maximum extinction ratio to be obtained, within the range of ±4 degrees, a very high extinction ratio of more than 40 dB could be obtained, and against the xmax, within the range of ±12 degrees, a very high extinction ratio of more than 30 dB could be obtained.

Figure 9:
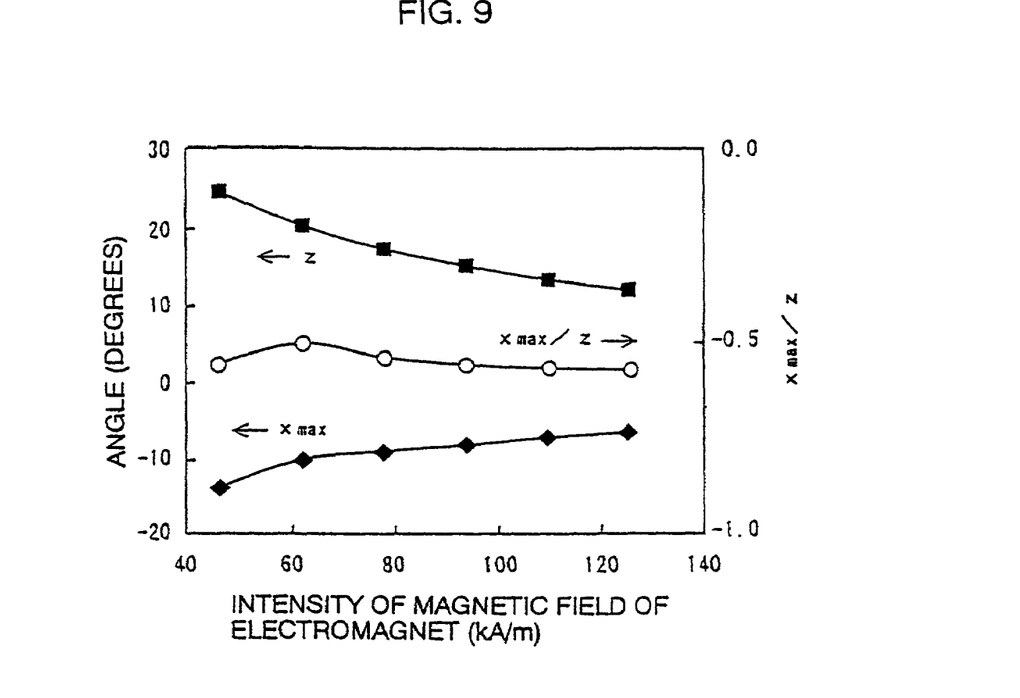
FIG. 9 is a graph showing the dependence on the intensity of an electromagnet magnetic field of angle z, angle xmax and xmax/z.

FIG. 9 shows the relation among the angle xmax, that allows the maximum extinction ratio to be obtained against the magnetic field intensity EM by the electromagnet, angle z and xmax/z. From the result, it can be recognized that the xmax/z is nearly −0.5, a constant value.

Figure 10:
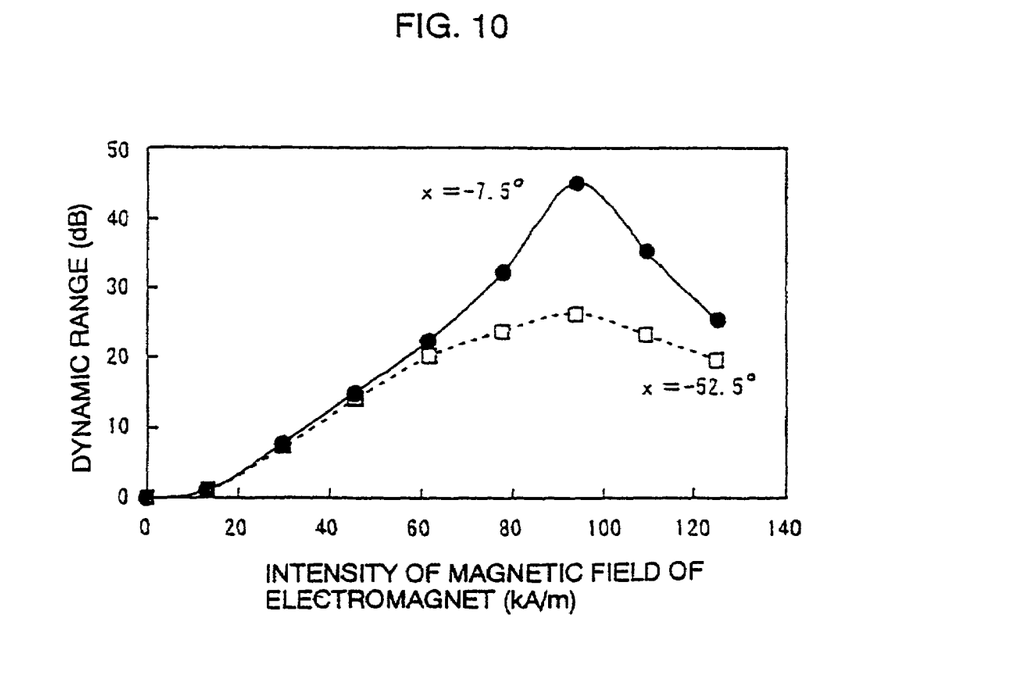
FIG. 10 is a graph showing the dependence of the dynamic range on the intensity of an electromagnet magnetic field.

Next, the angle x is fixed to −7.5 degrees, and an angle formed between the polarizer and the analyzer (both are made of compound polarizing prisms) is fixed to 105 degrees, and measurements were made on the dynamic range with a variety of magnetic field intensities EMs by the electromagnet. Also for comparison purpose, the result of measurement at the time of the angle x being −52.5 degrees was noted. These are basically the same configuration as the optical attenuator. FIG. 10 shows the result of measurement. It can be recognized, while the maximum dynamic range is only 25 dB when x=−52.5 degrees, when x=−7.5 degrees, the maximum dynamic range can be increased up to 45 dB. As an angle formed between the polarizer and the analyzer is 105 degrees, the "crossed-Nicol" state takes place when the light passing through the polarizer turned 15 degrees. Therefore, the angle, at which the maximum extinction ratio can be obtained, is 15×(−1/2)=−7.5 degrees. Accordingly, at the angle x=−7.5 degrees, the dynamic range becomes maximum.

Figure 11:
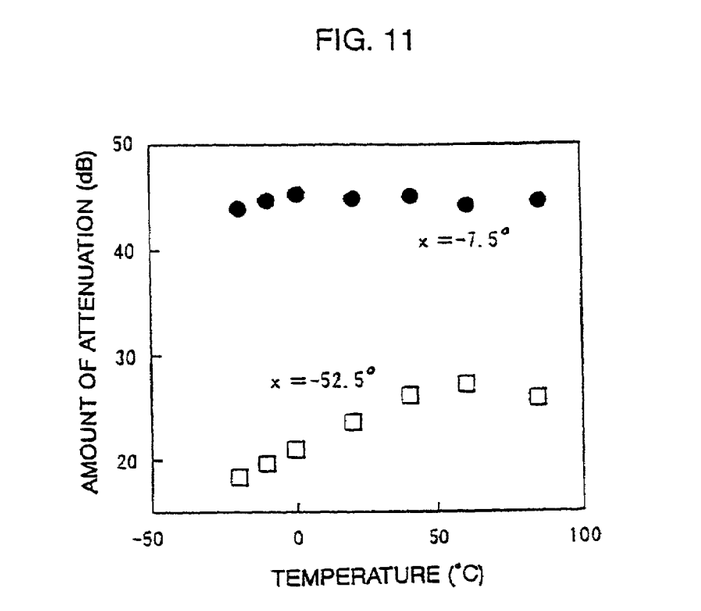
FIG. 11 is a graph showing the temperature-dependence of the attenuation amount.

FIG. 11 shows the result of measurement made on the temperature-dependence of the dynamic range, when x is set at −7.5 degrees and −52.5 degrees, respectively. In the case of x=−52.5 degrees, the lower the temperature drops, the more the dynamic range decreases, and there is a difference of about 10 dB in the dynamic ranges at +80° C. and at −20° C. On the contrary, in the case of x=−7.5 degrees, there is almost no temperature-dependence of the amount of attenuation in the range of −20° C. through +80° C., and the obtained amount of attenuation is about 45 dB.

As described above, when the angle x formed between the plane of polarization of the incident light to the garnet single crystal for the Faraday rotational angle variable device, and the applying magnetic field direction intersecting the light beam direction at right angles is set at somewhere near 0 degree, the dynamic range will be increased, thereby leading up to a possibility of effectively reduce its temperature-dependence. The measurement result described above is in the case of the angle x being somewhere near 0 degree, and similar results can be obtained near 90 degrees, near 180 degrees and near 270 degrees.

Embodiment 2

Figure 12:
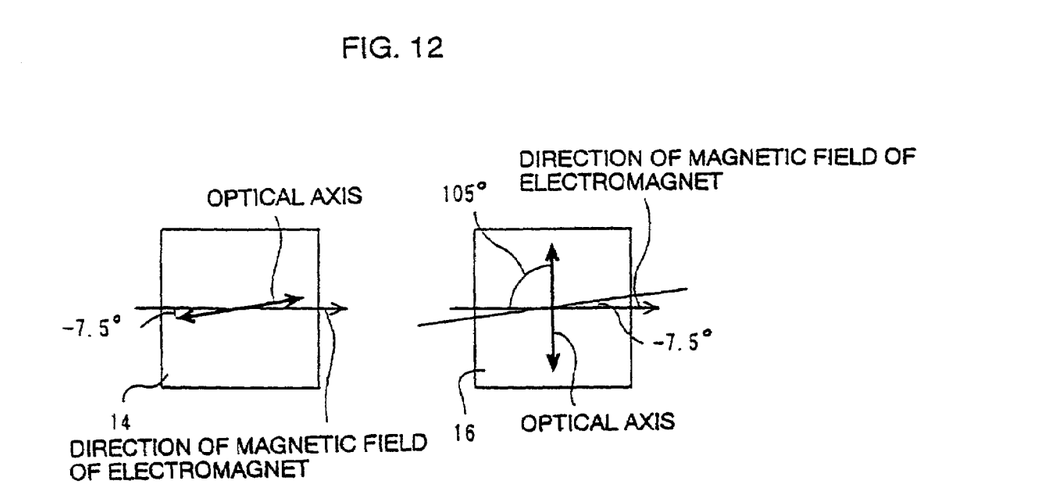
FIG. 12 is an explanatory diagram showing the relation between the optical axes of the polarizer and analyzer, and the magnetic field direction of the electromagnet in an embodiment of the present invention.

The present invention can be applied to a polarization non-dependent optical attenuator as shown in FIG. 1. A measurement system was manufactured, with a wedge type birefringent crystal (here, a rutile crystal) used for the polarizer and the analyzer in the measurement system shown in FIG. 3. External magnetic field to be applied to the garnet single crystal comprises two directions, a fixed magnetic field (16.6 kA/m) by the permanent magnet in a parallel direction to the light beam direction, and a variable magnetic field by the electromagnet in a direction intersecting at right angles. FIG. 12 shows the polarizer and analyzer, viewed from the traveling direction of light. A wedge-type birefringent crystal which functions as a polarizer 14 is set, so that an angle x formed between the applying magnetic field direction by the electromagnet to be applied in a direction intersecting the optical axis at right angles and the optical axis becomes −7.5 degrees. When viewed from the traveling direction of light, an angle formed between a wedge-type birefringent crystal to function as a polarizer 14 and a wedge-type birefringent crystal to function as an analyzer 16 is 105 degrees. In addition, the garnet single crystals as used and their arrangement are the same as those in the embodiment 1.

The principle behind the optical attenuator is as described previously regarding the conventional technology. As light will be separated into a horizontal element and a vertical element, against the optical axis of the wedge-type birefringent crystal, in short, the polarizer, in the present configuration, an angle formed between the plane of polarization of each element and the magnetic field is parallel or inclined at −7.5 degrees from a right angle, because an angle formed between the optical axis and the magnetic field to be applied in a direction intersecting the light beam at right angles is −7.5 degrees. This is the reason that the dynamic range can be increased, and its temperature-dependence can be reduced. When the applying magnetic field intensity by the electromagnet was 94 kA/m, the dynamic range 43 dB could be obtained. Also, when the temperature-dependence was measured, in the range of −20 through 80° C., more than 40 dB could be constantly obtained.

INDUSTRIAL APPLICABILITY

As set forth hereinabove, the optical attenuator of the present invention concerns an optical attenuator sets an angle x formed between the plane of polarization of the incident light to the garnet single crystal of the Faraday rotational angle variable device, and the direction of the magnetic field applied in the direction orthogonal to the light beam, into a specific range near the parallel direction or near the orthogonal direction, to minimize blunting taking place when light passes through the Faraday rotational angle variable device, and further sets to bring the light in that state into a state where the light intersects the analyzer at right angles, whereby the dynamic range can be increased to more than 30 dB, and further its temperature-dependence can substantially be reduced.

Especially, when the angle x is set within a narrow range, $[(-z/2)+90\times n]-4 \leq x \leq [(-z/2)+90\times n]+4$, the dynamic range can be increased to 40 dB or more, and very satisfactory attenuator characteristics can be obtained.

What is claimed is:

1. An optical attenuator using a Faraday rotational angle variable device having an optical axis, said optical attenuator comprising a polarizer and an analyzer which are disposed at the incoming side and outgoing side, respectively, on said optical axis of said Faraday rotational angle variable device, said Faraday rotational angle variable device applying an external magnetic field to a garnet single crystal and the like having a Faraday effect, from two directions or more, to vary the combined magnetic field to thereby control the Faraday rotational angle of light passing through said garnet single crystal, wherein let x be an angle, in degrees, which is formed between the plane of polarization of a single incident light to the garnet single crystal after passing through said polarizer, or the plane of polarization of one of two lights, whose planes of polarization intersect each other at right angles, and the direction of the magnetic field orthogonal to said optical axis, applied to said garnet single crystal, and let y be an angle, in degrees, which is formed between the polarizer and the analyzer, then the angle x satisfies $\{(-z/2)+90\times n\}-4 \leq x \leq \{(-z/2)+90\times n\}+4$ (n=0, 1, 2 or 3), where z=y±90; z is the angle of rotation of the plane of polarization, in degrees, caused by passing through the Faraday rotational angle variable device when the magnetic field is applied, and wherein temperature-dependence of the optical attenuator's dynamic range is reduced responsive to the selection of the angle x.

2. An optical attenuator using a Faraday rotational angle variable device having an optical axis, said optical attenuator comprising a polarizer and an analyzer which are disposed at the incoming side and outgoing side, respectively, on said optical axis of said Faraday rotational angle variable device, said Faraday rotational angle variable device applying an external magnetic field to a garnet single crystal and the like having a Faraday effect, from two directions or more, to vary the combined magnetic field to thereby control the Faraday rotational angle of light passing through said garnet single crystal, wherein said polarizer and said analyzer are in the form of a compound polarizing prism, said external magnetic field to said garnet single crystal being applied from two directions, a parallel direction and an orthogonal direction to the direction of light, wherein let x be an angle, in degrees, formed between the direction of said magnetic field applied in said orthogonal direction, and the plane of polarization of the incident light to the garnet single crystal after passing through the polarizer, and let y be an angle, in degrees, formed between the plane of polarization of light passing through said polarizer and the plane of polarization of light passing through said analyzer, then the angle x satisfies $\{(-z/2)+90\times n\}-4 \leq x \leq \{(-z/2)+90\times n\}+4$ (n=0, 1, 2 or 3), where z=y±90; z is the angle of rotation of the plane of polarization, in degrees, caused by passing through the Faraday rotational angle variable device when the magnetic field is applied, and wherein temperature-dependence of the optical attenuator's dynamic range is reduced responsive to the selection of the angle x.

3. An optical attenuator using a Faraday rotational angle variable device having an optical axis, said optical attenuator comprising a polarizer and an analyzer which are disposed at the incoming side and outgoing side, respectively, on said optical axis of said Faraday rotational angle variable device, said Faraday rotational angle variable device applying an external magnetic field to a garnet single crystal and the like having a Faraday effect, from two directions or more, to vary the combined magnetic field to thereby control the Faraday rotational angle of light passing through said garnet single crystal, wherein said polarizer and said analyzer are both made of a birefringent crystal, said external magnetic field to said garnet single crystal being applied from two directions, a parallel direction and an orthogonal direction to the direction of light, wherein let x be an angle, in degrees, formed between the direction of said magnetic field applied in said orthogonal direction, and the optic axis of said birefringent crystal serving as said polarizer, and let y be an angle, in degrees, formed between the optic axis of said polarizer and the optic axis of said birefringent crystal functioning as said analyzer, then the angle x satisfies $\{(-z/2)+90\times n\}-4 \leq x \leq \{(-z/2)+90\times n\}+4$ (n=0, 1, 2 or 3), where z=y±90; z is the angle of rotation of the plane of polarization, in degrees, caused by passing through the Faraday rotational angle variable device when the magnetic field is applied, and wherein over a temperature of range of about −20° C. to about 80° C., an attenuation of more than 40 db is readily obtained with substantially no reduction in the optical attenuator's dynamic range.

4. An optical attenuator using a Faraday rotational angle variable device having an optical axis, said optical attenuator comprising a polarizer and an analyzer which are disposed at the incoming side and outgoing side, respectively, on said optical axis of said Faraday rotational angle variable device, said Faraday rotational angle variable device applying an external magnetic field to a garnet single crystal and the like having a Faraday effect, from two directions or more, to vary the combined magnetic field to thereby control the Faraday rotational angle of light passing through said garnet single crystal, wherein said polarizer and said analyzer are both made of a birefringent crystal, the optic axis of said analyzer being oriented at 105 degrees clockwise (or counterclockwise) from the optic axis of said polarizer, said external magnetic field to said garnet single crystal being applied from two directions, a parallel direction and an orthogonal direction to the direction of light, the optic axis of said polarizer, said birefringent crystal, being oriented at 7.5 degrees counterclockwise (or clockwise) from the direction of said magnetic field to be applied in said orthogonal direction, and wherein over a temperature of range of about −20° C. to about 80° C., an attenuation of more than 40 db is readily obtained with substantially no reduction in the optical attenuator's dynamic range.

* * * * *